(No Model.)
W. W. HUNTLEY.
CLUTCH.
No. 554,781.  Patented Feb. 18, 1896.
3 Sheets—Sheet 1.
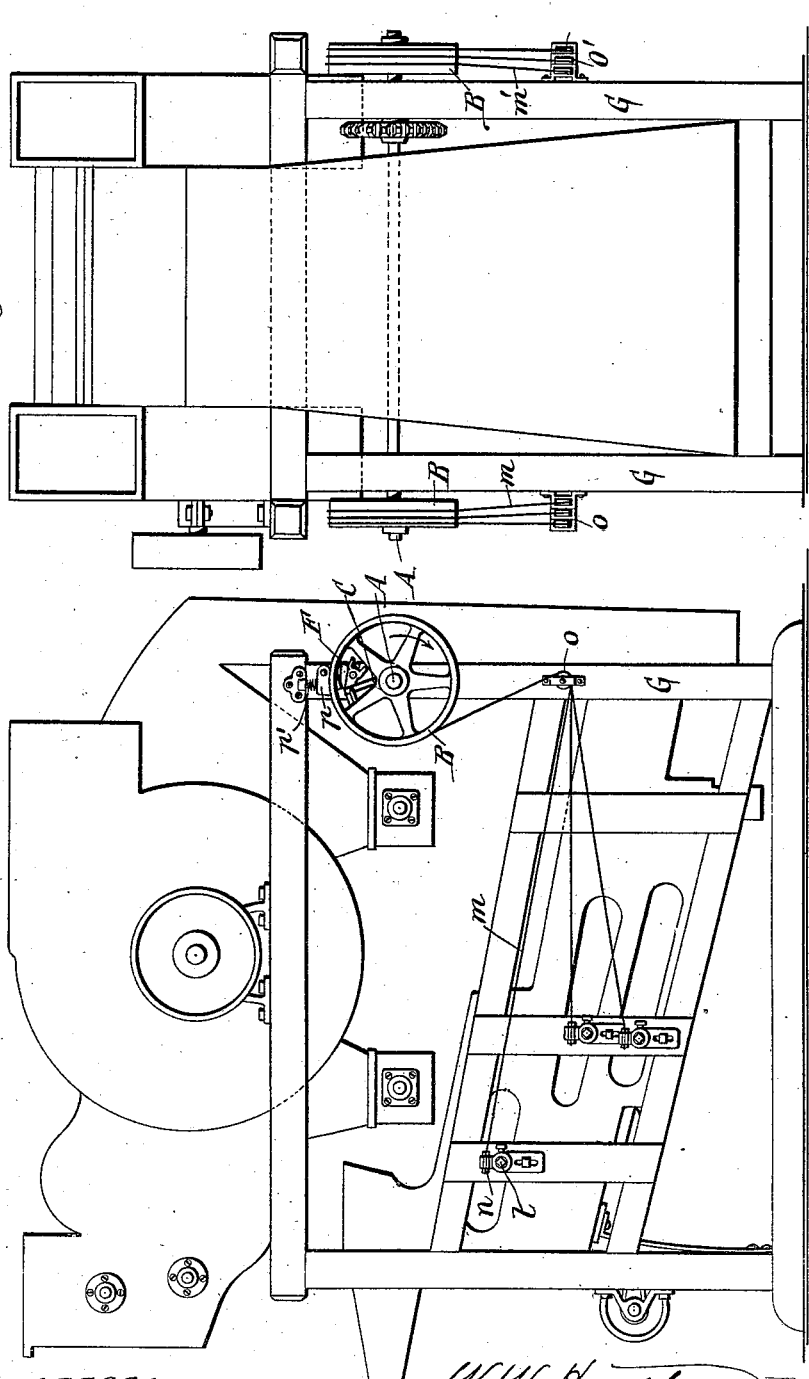
Witnesses:
F. Gustav Wilhelm
Theo. L. Popp
W. W. Huntley Inventor.
By Wilhelm & Bonner
Attorneys.

(No Model.) 3 Sheets—Sheet 2.

W. W. HUNTLEY.
CLUTCH.

No. 554,781. Patented Feb. 18, 1896.

Witnesses:
Theo. L. Popp
F. Gustav Wilhelm

W. W. Huntley, Inventor.
By Wilhelm Bonner
Attorneys.

(No Model.) 3 Sheets—Sheet 3.
W. W. HUNTLEY.
CLUTCH.
No. 554,781. Patented Feb. 18, 1896.
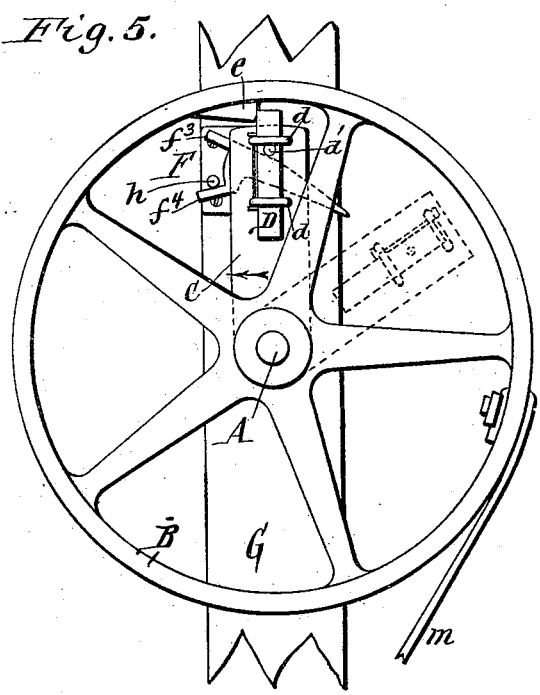
Fig. 5.
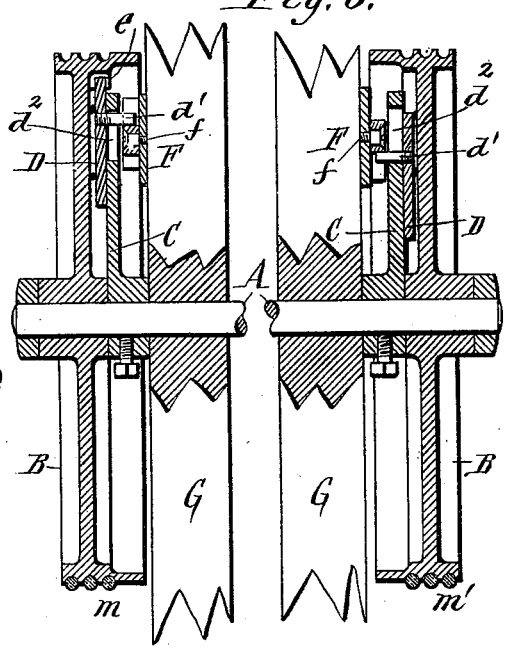
Fig. 6.
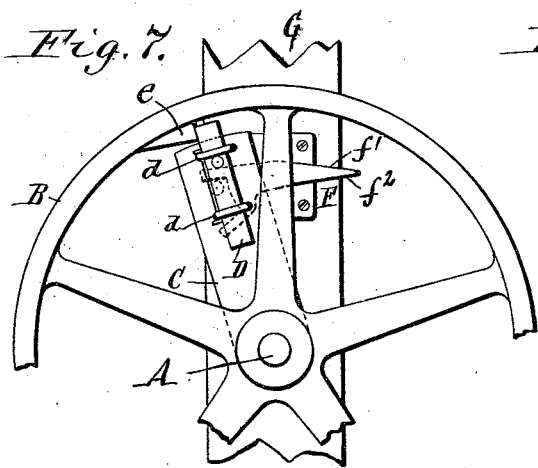
Fig. 7.
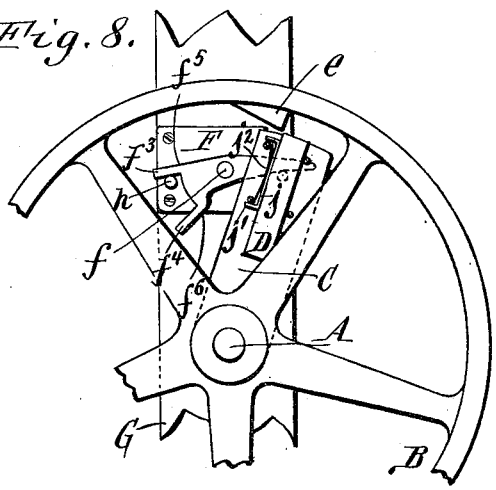
Fig. 8.
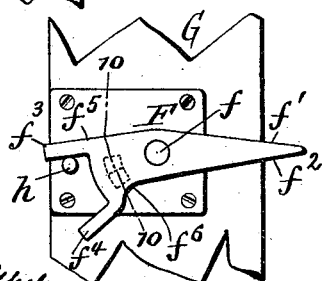
Fig. 9.
Fig. 10.
Witnesses:
F. Gustav Wilhelm
Theo. L. Popp
W. W. Huntley, Inventor.
By Wilhelm Bonner, Attorneys.

UNITED STATES PATENT OFFICE.

WILLIAM W. HUNTLEY, OF SILVER CREEK, NEW YORK, ASSIGNOR TO THE HUNTLEY MANUFACTURING COMPANY, OF SAME PLACE.

CLUTCH.

SPECIFICATION forming part of Letters Patent No. 554,781, dated February 18, 1896.

Application filed August 27, 1894. Serial No. 521,363. (No model.)

*To all whom it may concern:*

Be it known that I, WILLIAM W. HUNTLEY, a citizen of the United States, residing at Silver Creek, in the county of Chautauqua and State of New York, have invented a new and useful Improvement in Clutches, of which the following is a specification.

The object of this invention is the construction of a simple clutch whereby a pulley or similar part may be automatically thrown into and out of gear with a driving-shaft. Such a clutch is desirable, for instance, as an element in a reversing mechanism for imparting a reciprocating motion to the cleaner-brush of a bolting-screen.

Figure 3:
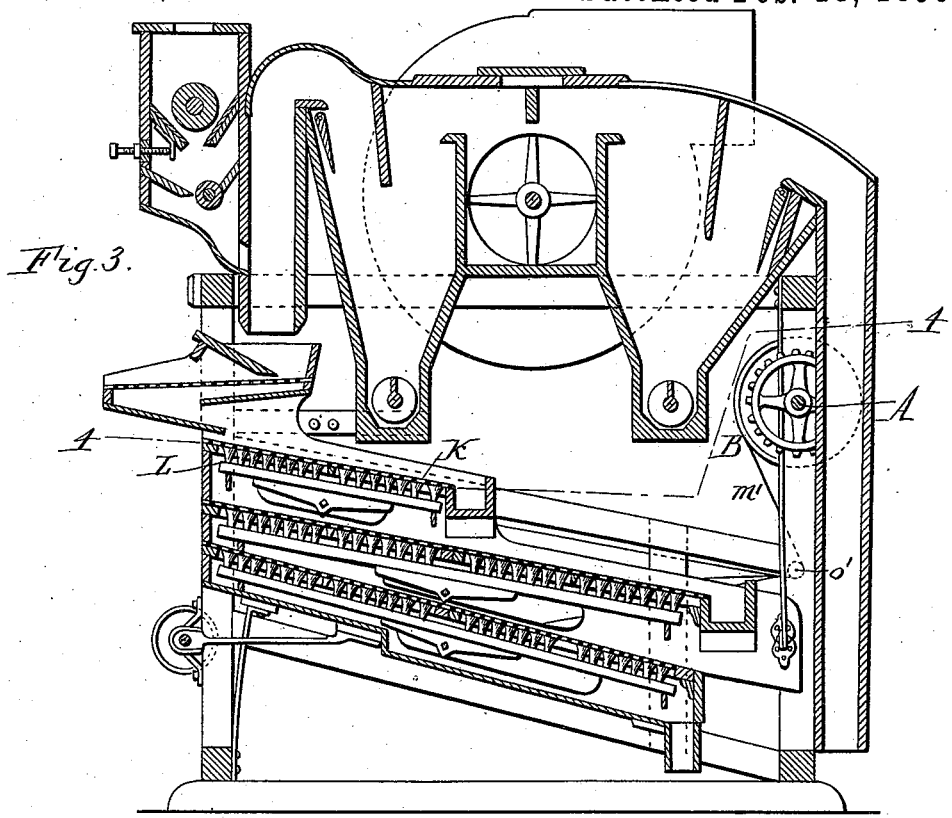
Figure 4:
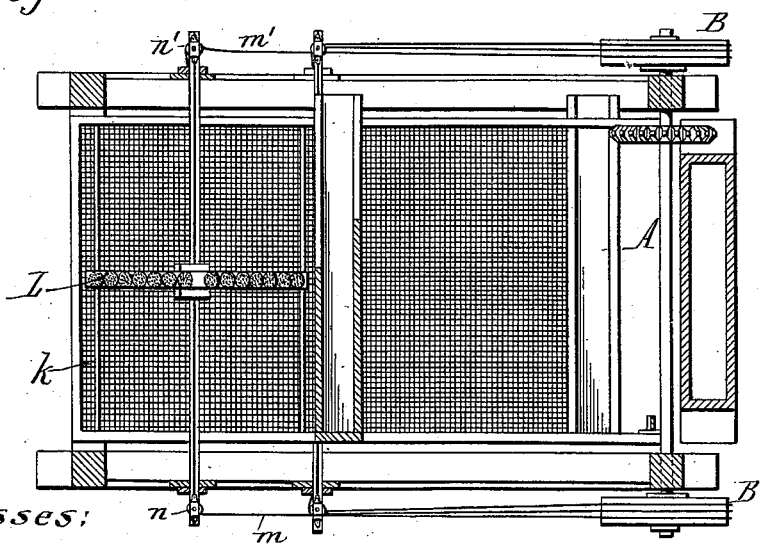

In the accompanying drawings, consisting of three sheets, Figure 1 is a side elevation of a grain-separator having a brush-actuating mechanism embodying my improved clutch. Fig. 2 is an end view thereof. Fig. 3 is a longitudinal section of the same. Fig. 4 is a horizontal section of the machine in line 4 4, Fig. 3. Fig. 5 is an enlarged side elevation of one of the pulleys and its clutch, showing the pulley in gear with the shaft. Fig. 6 is a contracted sectional elevation of the driving-shaft and the two pulleys mounted thereon, showing one of the pulleys in gear and the other out of gear with the shaft. Fig. 7 is a view similar to Fig. 5, showing the cam reversed preparatory to retracting the clutch-bolt. Fig. 8 is a similar view showing the clutch-bolt partly retracted by the cam. Fig. 9 is an enlarged side elevation of the cam and its support, showing it in the same position as in Figs. 7 and 8. Fig. 10 is a cross-section in line 10 10, Fig. 9, showing the retaining-catch of the cam.

Like letters of reference refer to like parts in the several figures.

A is a driving-shaft, and B is a pulley or drum mounted on said shaft and connected therewith by my improved clutch. This clutch is constructed as follows: The pulley is mounted loosely on the shaft and a radial supporting-arm C is secured to the shaft adjacent to the pulley, so as to turn continuously in one direction with the shaft.

D is a clutch bolt or pawl arranged to slide radially on said supporting-arm and guided in loops $d$ secured to the arm, and $d'$ is an actuating-pin projecting from the inner side of the bolt and passing through a slot $d^2$ in the supporting-arm. The clutch is capable of being projected into the path of a lug or projection $e$ arranged on the inner side of the pulley-rim, so as to engage against the same and compel the pulley to rotate with the arm and the shaft, and of being retracted to clear said lug or projection, so as to disconnect the pulley from the shaft and allow the same to remain at rest or turn independently of the shaft.

F is a shifting device whereby the clutch-bolt is automatically moved in opposite directions, so as alternately to throw the pulley into and out of gear with the shaft. This shifting device consists of a reversible cam which is pivoted at $f$ to an upright or stationary support G, arranged adjacent to the pulley. This cam is provided on the front side of its pivot with inclined shifting-faces $f'$ and $f^2$, which converge from points on opposite sides of said pivot toward the front end of the cam, and over which the actuating-pin $d'$ of the clutch-bolt is adapted to ride alternately for projecting and retracting the bolt.

$f^3$ and $f^4$ represent projections arranged on the portion of the reversible cam in rear of its pivot and adapted to strike alternately against a stop-pin $h$, secured to the upright G, between said projections. This stop-pin limits the swinging movement of the cam and causes its operative shifting-faces to act as a fixed incline in the interval during which the actuating-pin of the clutch-bolt passes from the base of the incline to a point opposite the pivot of the cam, or, in other words, past the dead-center of the cam. The cam is provided on the rear side of its pivot with rearwardly-diverging trip-faces $f^5 f^6$, which form continuations of the shifting-faces $f'$ and $f^2$ of the cam. The actuating-pin of the clutch-bolt, after riding over one of the inclined shifting-faces of the reversible cam, passes over the corresponding trip-face of the cam, as shown in Fig. 7, thereby reversing the same. As soon as the actuating-pin of the clutch-bolt, in passing from the shifting-face to the trip-face of the cam, arrives opposite the pivot of the cam, the stop-pin $h$ no longer restrains the swinging movement of the cam, but allows it to be tripped by said pin. The cam is so located with reference to the actuating-pin of the clutch-bolt that when the lower projection, $f^4$, of the cam bears against the stop-pin $h$ the upper shifting-face, $f'$, of the cam stands in the path of the actuating-pin, while when the upper projection, $f^3$, of the cam bears against the stop-pin the lower shifting-face, $f^2$, of the cam stands in the path of the actuating-pin.

In the position of the parts shown in Fig. 5 and in connection with the left-hand pulley in Fig. 6 the clutch-bolt has just been projected by its actuating-pin $d'$ riding up the upper shifting-face, $f'$, of the cam, thus sliding the bolt outward, causing it to engage against the lug or projection of the pulley and compelling the latter to turn with the shaft in the direction of the arrow shown in Fig. 5. During this outward movement of the clutch-bolt the upper shifting-face of the cam is prevented from swinging away from the actuating-pin by the lower projection of the cam bearing against the stop-pin $h$. The continued forward movement of the actuating-pin of the clutch-bolt causes said pin to pass the dead-center of the cam and ride over the upper trip-face, $f^5$, and as the cam is now free to oscillate on its pivot it is reversed by said actuating-pin to the position shown in Figs. 7, 8, and 9. The reversal of the cam brings its lower shifting-face, $f^2$, into the path of the actuating-pin of the clutch-bolt, and when said pin, after making a complete revolution with the pulley, strikes said lower shifting-face, as shown in Fig. 8, it is caused to draw the bolt inwardly out of engagement with the lug of the pulley, as shown in connection with the right-hand pulley in Fig. 6, thereby throwing the pulley out of gear with the shaft. The lower shifting-face of the cam is prevented from swinging away from the actuating-pin of the clutch-bolt during the retraction of the latter by the upper projection, $f^3$, of the cam bearing against the stop-pin $h$. The actuating-pin upon riding over said lower shifting face and passing the dead-center of the cam encounters and rides over the lower trip-face, $f^6$, of the latter, thereby reversing the same to its former position (shown in Fig. 5) ready to again project the clutch-bolt and couple the pulley to the shaft. The clutch-bolt is thus alternately projected and retracted by the shifting-faces of the cam, and the cam is in turn reversed by the bolt as soon as the bolt has been shifted by the cam, this action continuing automatically so long as the shaft rotates.

In order to prevent accidental displacement of the oscillatory cam while out of contact with the clutch-bolt, a yielding retaining-catch $i$ is employed. This catch preferably consists of a spring-bolt guided in an opening or socket in the upright G, as shown in Fig. 10, and engaging with one or the other of two notches or recesses $i'$, formed in the rear side of the cam. The end of this spring-bolt is V-shaped, and the sides of the recesses $i'$ are correspondingly beveled, so as not to form a positive lock, but allow the cam to be shifted from one of its positions to the other, while at the same time restraining its movement sufficiently to avoid accidental displacement thereof.

For the purpose of reliably retaining the clutch-bolt in place on its carrying-arm the same is provided with a friction device which yieldingly holds it against sliding in its guides. As represented in Fig. 8, a gib $j$ is placed between one side of the clutch-bolt and its guide-loops and provided with lips $j'$ at its ends, which bear against the outer sides of the loops and hold the gib against longitudinal movement. This gib is pressed against the bolt by a flat spring $j^2$ bearing with its central portion against the bolt and with its ends against the inner side of the guide-loops, thereby preventing the spring from becoming detached.

When my improved clutch is used in connection with a grain-separator or similar machine for actuating the reciprocating brush of a shaking screen, two pulleys or drums are mounted upon the opposite ends of the horizontal driving-shaft and connected therewith by my improved clutch, and the clutches are so arranged that one pulley is in gear with the shaft when the other is out of gear.

$k$ represents one of the shaking screens of the grain-separator, which may be actuated by any well-known means, and L is the cleaning-brush traversing the under side of the screen. This brush reciprocates transversely of the screen and may slide upon a guide-rod $l$ secured to the main frame underneath the screen-frame.

$m$ and $m'$ are actuating or draft cords secured to opposite sides of the brush and passing outwardly from the latter around guide-rollers $n$ and $n'$, arranged at the outer ends of the guide-rod $l$, thence rearward to and around guide-rollers $o$ and $o'$, journaled on opposite sides of the main frame underneath the pulleys B, and thence to such pulleys, to which latter the adjacent ends of the cords are secured respectively, so that the rotation of the pulleys causes the cords to be wound upon the rims of the pulleys. As one of the pulleys is loose on the shaft while the other is in gear therewith, the cord connected with the tight pulley is wound upon the latter and caused to draw the brush toward the adjacent side of the machine, while the cord connected with the loose pulley is allowed to unwind and follow the brush by the backward rotation of the loose pulley on the shaft. The brush is thus reciprocated by the alternate winding and unwinding of the cords upon their pulleys, produced by the action of the clutches. When the movement of the brush is reversed, the pulley from which the cord is unwound is liable to be turned backward too rapidly and allow the cord to slacken. To prevent this, each pulley is provided with a brake or friction block $p$, which is pivoted at one end to the main frame and yieldingly pressed against the face of the pulley by a spring $p'$.

I claim as my invention—

1. The combination with a shaft and a pulley mounted loosely thereon, of an arm secured to said shaft, a clutch-bolt carried by said arm and adapted to engage with said pulley and an automatically-reversible shifting device having a pair of shifting-faces both adapted to engage against said clutch-bolt, one of said faces operating to project the clutch-bolt into engagement with said pulley and the other operating to retract the bolt out of engagement with the pulley, substantially as set forth.

2. The combination with the shaft and the pulley mounted loosely on said shaft, of a rotary arm secured to said shaft, a clutch bolt or pawl carried by said rotary arm, and an automatically-reversible cam pivoted to a fixed support adjacent to said pulley and having shifting-faces adapted to engage alternately with the clutch bolt or pawl for shifting the latter, and trip-faces against which said clutch bolt or pawl operates alternately for reversing the cam, substantially as set forth.

3. The combination with a shaft and a pulley mounted loosely on said shaft, of a rotary arm secured to said shaft, a clutch bolt or pawl carried by said rotary arm and having an actuating-pin, a pivoted cam mounted on a fixed support adjacent to the pulley and provided on the front side of its pivot with forwardly-converging shifting-faces adapted to engage with the pin of said clutch bolt or pawl and on the rear side of its pivot with rearwardly-diverging trip-faces against which said pin is adapted to operate for reversing the cam, and a stop whereby the movement of the shifting-cam is arrested while either of said converging faces is in contact with said pin, substantially as set forth.

4. The combination with a shaft and a pulley mounted loosely on said shaft, of a rotary arm secured to said shaft, a clutch bolt or pawl carried by said rotary arm and having an actuating-pin, a pivoted cam mounted on a fixed support adjacent to the pulley and provided on the front side of its pivot with forwardly-converging shifting-faces adapted to engage with the pin of said clutch bolt or pawl and on the rear side of its pivot with rearwardly-diverging trip-faces against which said pin is adapted to operate for reversing the cam, and with stop projections, and a stop-pin arranged on said fixed support between the stop projections of the cam, substantially as set forth.

5. The combination with the shaft and the pulley mounted loosely on said shaft, of a rotary arm secured to said shaft, a clutch bolt or pawl carried by said rotary arm, an automatically-reversible cam pivoted to a fixed support adjacent to said pulley and having shifting-faces adapted to engage alternately with the clutch bolt or pawl for shifting the latter, and trip-faces against which said clutch bolt or pawl operates alternately for reversing the cam and a catch whereby said cam is yieldingly retained in position, substantially as set forth.

6. The combination with a shaft and a pulley mounted thereon, of an arm secured to said shaft, a sliding clutch-bolt guided on said arm and adapted to engage with said pulley, an automatically-reversible cam having shifting-faces adapted to engage alternately with said clutch-bolt for projecting and retracting the same and a frictional retaining-spring bearing against one side of the clutch-bolt whereby the same is yieldingly held against accidental displacement, substantially as set forth.

7. The combination with a shaft and a pulley mounted loosely thereon, of a radial supporting-arm secured to said shaft, a sliding clutch bolt or pawl guided in loops arranged on said arm, a gib arranged between one side of said bolt or pawl and the inner sides of the guide-loops and provided at its ends with lips bearing against the outer sides of said loops, and a flat retaining-spring bearing with its central portion against said bolt or pawl, and with its ends against the inner sides of said loops, substantially as set forth.

Witness my hand this 13th day of August, 1894.

WILLIAM W. HUNTLEY.

Witnesses:
CARL D. FREEBURG,
DON MARTIN.